(12) United States Patent
Chen et al.

(10) Patent No.: US 10,757,698 B2
(45) Date of Patent: Aug. 25, 2020

(54) TRANSMISSION TIME INTERVAL (TTI) BUNDLING FOR PHYSICAL DOWNLINK SHARED CHANNEL (PDSCH)

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1345 days.

(21) Appl. No.: 14/264,220

(22) Filed: Apr. 29, 2014

(65) Prior Publication Data

US 2015/0029903 A1 Jan. 29, 2015

Related U.S. Application Data

(60) Provisional application No. 61/859,111, filed on Jul. 26, 2013.

(51) Int. Cl.
*H04W 72/04* (2009.01)
*H04W 4/06* (2009.01)
(Continued)

(52) U.S. Cl.
CPC ....... *H04W 72/0446* (2013.01); *H04L 1/0078* (2013.01); *H04L 1/189* (2013.01); *H04W 4/06* (2013.01); *H04L 5/0053* (2013.01)

(58) Field of Classification Search
CPC .. H04W 72/0446; H04W 4/06; H04L 1/0078; H04L 1/189; H04L 5/0053
See application file for complete search history.

(56) References Cited

U.S. PATENT DOCUMENTS

| 9,107,186 B2 | 8/2015 | Zhang et al. |
| 9,407,409 B2 | 8/2016 | Bhattad et al. |

(Continued)

FOREIGN PATENT DOCUMENTS

| CN | 103069875 A | 4/2013 |
| JP | 2014515901 A | 7/2014 |

(Continued)

OTHER PUBLICATIONS

International Search Report and Written Opinion—PCT/US2014/036101—ISA/EPO—dated Jul. 24, 2014.

(Continued)

*Primary Examiner* — Walter J Divito
(74) *Attorney, Agent, or Firm* — Patterson & Sheridan, L.L.P.

(57) ABSTRACT

Certain aspects of the present disclosure propose techniques for transmission time interval (TTI) bundling for physical downlink shared channel (PDSCH) in long term evolution (LTE). According to certain aspects a method is provided for wireless communications. The method may be performed, for example, by a user equipment (UE). The method generally includes identifying a transmit time interval (TTI) bundle comprising a subset of subframes from a set of subframes for transmitting data on a physical downlink shared channel (PDSCH) and receiving the data on the PDSCH in the subset of subframes.

54 Claims, 5 Drawing Sheets

(51) Int. Cl.
*H04L 1/18* (2006.01)
*H04L 1/00* (2006.01)
*H04L 5/00* (2006.01)

(56) References Cited

U.S. PATENT DOCUMENTS

| | | | |
|---|---|---|---|
| 2011/0317657 A1* | 12/2011 | Chmiel | H04L 5/001 370/331 |
| 2012/0182946 A1* | 7/2012 | Chen | H04L 5/0032 370/329 |
| 2012/0257562 A1 | 10/2012 | Kim et al. | |
| 2013/0083753 A1 | 4/2013 | Lee et al. | |
| 2013/0107828 A1* | 5/2013 | Dinan | H04W 52/346 370/329 |
| 2013/0336224 A1* | 12/2013 | Davydov | H04B 7/2656 370/328 |
| 2014/0098761 A1* | 4/2014 | Lee | H04W 72/005 370/329 |
| 2016/0043849 A1* | 2/2016 | Lee | H04W 72/042 370/329 |

FOREIGN PATENT DOCUMENTS

| | | |
|---|---|---|
| JP | 2014531856 A | 11/2014 |
| WO | WO-2011044290 A1 | 4/2011 |
| WO | WO-2011106457 A2 | 9/2011 |
| WO | WO-2012116219 A1 | 8/2012 |

OTHER PUBLICATIONS

Alcatel-Lucent, et al., "Feasibility of coverage extension of physical channels for MTC devices," 3GPP Draft; R1-130462—REL-12 MTC Coverage—Coverage Ext Phy Channels V0.3, 3rd Generation Partnership Project (3GPP), Mobile Competence Centre; 650, Route Des Lucioles; F-06921 Sophia-Antipoles C, vol. RAN WG1, No. St Julian; Jan. 28, 2013-Feb. 1, 2013, Jan. 19, 2013 (Jan. 19, 2013), XP050663744, 7 pages, Retrieved from the Internet < URL : http://www/3gpp.org/ftp/tsg_ran/WG1_RL1/TSGR1_72/Docs/ >, [retrieved on Jan. 19, 2013].

Huawei et al., "Coverage analysis and evaluation on PDSCH/PUSCH and Reference Signals for low-cost MTC UEs", 3GPP Draft; R1-130888, 3RD Generation Partnership Project (3GPP), Mobile Competence Centre ; 650, Route Des Lucioles; F06921 Sophia-Antipolis Cedex; France, vol. RAN WG1, No. Chicago,USA; Apr. 15, 2013-Apr. 19, 2013, Apr. 6, 2013 (Apr. 6, 2013),XP050696889, Retrieved from the Internet: URL:http://www.3gpp.org/ftp/tsg_ran/WG1_RL1/TSGR1_72b/Docs/ [retrieved on Apr. 6, 2013].

LG Electronics : "Text Proposal on Coverage Enhancement for a MTC UE ", 3GPP Draft; R1-130264 (MTC TP LG), 3rd Generation Partnership Project (3GPP), Mobile Competence Centre; 650, Route Des Lucioles; F-06921 Sophia-Antipolis Cedex; France,vol. RAN WG1, No. St Julian; Jan. 28, 2013-Feb. 1, 2013 Jan. 18, 2013 (Jan. 18, 2013), XP050663396, Retrieved from the Internet: URL:http://www.3gpp.org/ftp/tsg_ran/WG1_RL1/TSGR1_72/Docs/ [retrieved on Jan. 18, 2013].

Qualcomm Incorporated: "Coverage Enhancement Techniques for MTC," 3GPP Draft; R1-125120 Coverage Enhancement Techniques for MTC, 3rd Generation Partnership Project (3GPP), Mobile Competence Centre; 650, Route Des Lucioles; F-06921 Sophia-Antipolis Cedex; France, vol. RAN WG1, No. New Orleans, USA; Nov. 12, 2012-Nov. 16, 2012, Nov. 3, 2012 (Nov. 3, 2012), 7 pages, XP050662981, Retrieved from the Internet < URL: http://www.3gpp.org/ftp/tsg_ran/WG1_RL1/TSGR1_71/Docs >, [retrieved on Nov. 3, 2012], the whole document.

European Search Report—EP19169266—Search Authority—The Hague—dated Jun. 11, 2019.

LG Electronics: "Text Proposal for Coverage Enhancement of MTC UEs", 3GPP TSG RAN WG1 Meeting #72bis, 3GPP Draft; R1-131294, 3rd Generation Partnership Project (3GPP), Chicago, USA, Apr. 15-19, 2013, 6 Pages, Retrieved from the Internet: URL: http://www.3gpp.org/ftp/tsg_ran/WG1_RL1/TSGR1_72b/Docs/R1-131294.zip.

LG Electronics: "Text Proposal on Coverage Enhancement for a MTC UE", 3GPP TSG RAN WG1 #72, 3GPP Draft, R1-130264, vol. RAN WG1, No. St Julian, Jan. 18, 2013 (Jan. 18, 2013), 16 Pages, XP050663396, 650, Route Des Lucioles; F-06921 Sophia-Antipolis Cedex; France, Retrieved from the Internet: URL: http://www.3gpp.org/ftp/tsg_ran/WG1_RL1/TSGR1_72/Docs/ [retrieved on Jan. 18, 2013] sections 9.4.1, 9.5.4 and 9.5.5.

* cited by examiner

TRANSMISSION TIME INTERVAL (TTI) BUNDLING FOR PHYSICAL DOWNLINK SHARED CHANNEL (PDSCH)

CLAIM OF PRIORITY UNDER 35 U.S.C. § 119

This application claims benefit of U.S. Provisional Patent Application Ser. No. 61/859,111, filed Jul. 26, 2013, which is herein incorporated by reference in its entirety.

BACKGROUND

I. Field

Certain embodiments of the present disclosure generally relate to wireless communications and, more particularly, to transmission time interval (TTI) bundling for physical downlink shared channel (PDSCH) in long term evolution (LTE).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station. In an FDD system, forward and reverse link transmissions are on different frequency regions.

Main focus of the traditional LTE design is on the improvement of spectral efficiency, ubiquitous coverage, enhanced quality of service (QoS) support, and the like. This typically results in high end devices, such as the state-of-art smart phones, tablets, etc. However, low cost, low rate devices need to be supported as well. Some market projections show that the number of low cost devices may largely exceed number of today's cell phones.

A study item on provision of low-cost MTC (machine type communications) UEs based on LTE was done in LTE Rel-11. Particularly, the following items are under study: reduction of maximum bandwidth, single receive RF chain, reduction of peak rate, reduction of transmit power, half duplex operation.

Since the intended data rate for the low cost device is less than 100 kbps, it is possible to operate the device only at narrowband width to reduce the cost. Two operation scenarios may be considered. One straight-forward deployment scenario is to set aside some narrow bandwidth, e.g. 1.25 MHz, to support the MTC operations. No standard changes are necessary for such operations. Another, more interesting scenario is to operate low cost UEs in a large bandwidth. In this case, low cost UEs may co-exist with regular UEs. Two possible scenarios may be considered for operation of low cost UEs in a large bandwidth. In one scenario, low cost UEs may operate over the whole available bandwidth (e.g., up to 20 MHz). This scenario may not have any impact on the standards, but it may not be helpful in reducing cost and battery power consumption. In another scenario, low cost UEs may operate over a small portion of the bandwidth.

SUMMARY

Techniques and apparatus are provided herein for wireless communications and, more particularly, to transmission time interval (TTI) bundling for physical downlink shared channel (PDSCH) in long term evolution (LTE). "LTE" may refer to LTE and LTE-Advanced.

Certain aspects of the present disclosure provide a method for wireless communications by a user equipment (UE). The method generally includes identifying a transmit time interval (TTI) bundle comprising a subset of subframes from a set of subframes for transmitting data on a physical downlink shared channel (PDSCH) and receiving the data on the PDSCH in the subset of subframes.

Certain aspects of the present disclosure provide a method for wireless communications by a base station (BS). The method generally includes identifying a transmit time interval (TTI) bundle comprising a subset of subframes from a set of subframes for transmitting data on a physical downlink shared channel (PDSCH) and transmitting the data on the PDSCH in the subset of subframes.

Certain aspects of the present disclosure provide an apparatus for wireless communications by a user equipment (UE). The apparatus generally includes means for identifying a transmit time interval (TTI) bundle comprising a subset of subframes from a set of subframes for transmitting data on a physical downlink shared channel (PDSCH) and means for receiving the data on the PDSCH in the subset of subframes.

Certain aspects of the present disclosure provide an apparatus for wireless communications by a user equipment (UE). The apparatus generally includes at least one processor configured to identify a transmit time interval (TTI) bundle comprising a subset of subframes from a set of subframes for transmitting data on a physical downlink shared channel (PDSCH) and receive the data on the PDSCH in the subset of subframes. The apparatus generally also includes a memory coupled with the at least one processor.

Certain aspects of the present disclosure provide a computer-readable storage media comprising program instructions to implement a wireless communication system. The storage media generally include program instructions that identify a transmit time interval (TTI) bundle comprising a subset of subframes from a set of subframes for transmitting data on a physical downlink shared channel (PDSCH) and program instructions that receive the data on the PDSCH in the subset of subframes.

Certain aspects of the present disclosure provide an apparatus for wireless communications by a base station (BS). The apparatus generally includes means for identifying a transmit time interval (TTI) bundle comprising a subset of subframes from a set of subframes for transmitting data on a physical downlink shared channel (PDSCH) and means for transmitting the data on the PDSCH in the subset of subframes.

Certain aspects of the present disclosure provide an apparatus for wireless communications by a base station (BS). The apparatus generally includes at least one processor configured to identify a transmit time interval (TTI) bundle comprising a subset of subframes from a set of subframes for transmitting data on a physical downlink shared channel (PDSCH) and transmit the data on the PDSCH in the subset of subframes. The apparatus generally also includes a memory coupled with the at least one processor.

Certain aspects of the present disclosure provide a computer-readable storage media comprising program instructions to implement a wireless communication system. The storage media generally include program instructions that identify a transmit time interval (TTI) bundle comprising a subset of subframes from a set of subframes for transmitting data on a physical downlink shared channel (PDSCH) and program instructions that transmit the data on the PDSCH in the subset of subframes.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
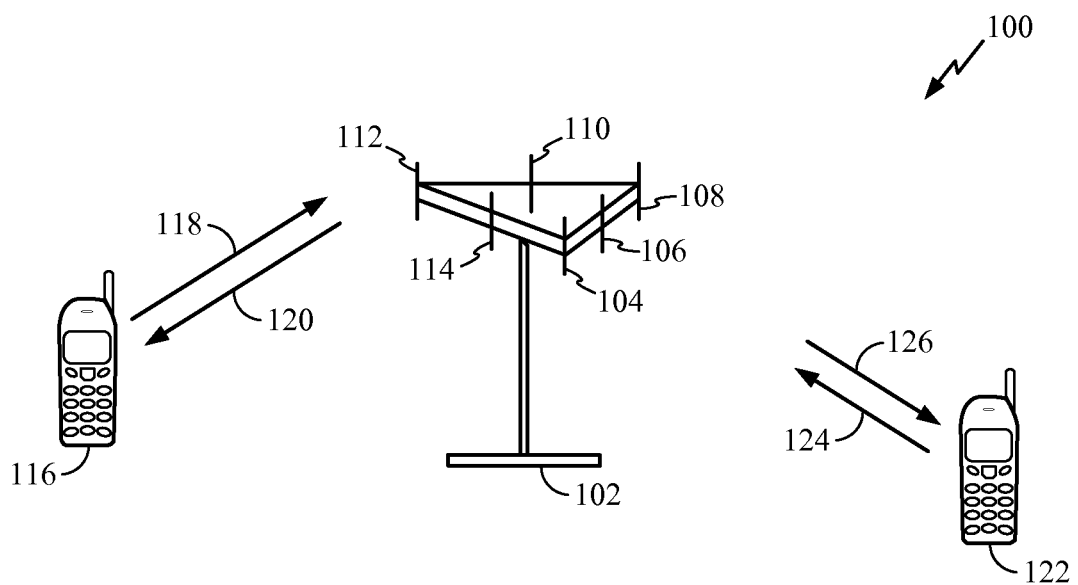
FIG. 1 illustrates a multiple access wireless communication system, in accordance with certain aspects of the present disclosure.

Techniques are provided herein for transmission time interval (TTI) bundling for physical downlink shared channel (PDSCH) in long term evolution (LTE). According to certain aspects, TTI bundling for PDSCH may be subframe dependent in order to ensure proper system operation in the cases of collisions with reference signals (RS) (e.g., channel state information (CSI) RS or positioning RS (PRS)). For example, only a subset of possible of subframes may be bundled. In order to avoid collisions, reference signals may be dropped in certain subframes. For certain aspects, the reference signals may puncture the PDSCH or rate matching may be performed around resource elements occupied by the reference signals. For certain aspects, different techniques may be used for different types of PDSCH (e.g., paging or PDSCH with system information block (SIB)).

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, software/firmware, a combination of hardware and software/firmware, or software/firmware in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a smart phone, a tablet, an ultrabook, a netbook, a smartbook, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE/LTE-Advanced (LTE-A), and LTE/LTE-A terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Example Wireless Communications System

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 104, where antennas 106 and 104 transmit information to access terminal 122 over forward link 126 and receive information from access terminal 122 over reverse link 124. In a Frequency Division Duplex (FDD) system, communication links 118, 120, 124 and 126 may use a different frequency for communication. For example, reverse link 118 may use a different frequency than that used by forward link 120.

Each group of antennas and/or the area in which they are designed to communicate is often referred to as a sector of the access point. In an aspect, antenna groups each are designed to communicate to access terminals in a sector of the areas covered by access point 102.

In communication over forward links 120 and 126, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102 or the access terminals 116, 122 may utilize the proposed interference cancellation technique to improve performance of the system.

Figure 2:
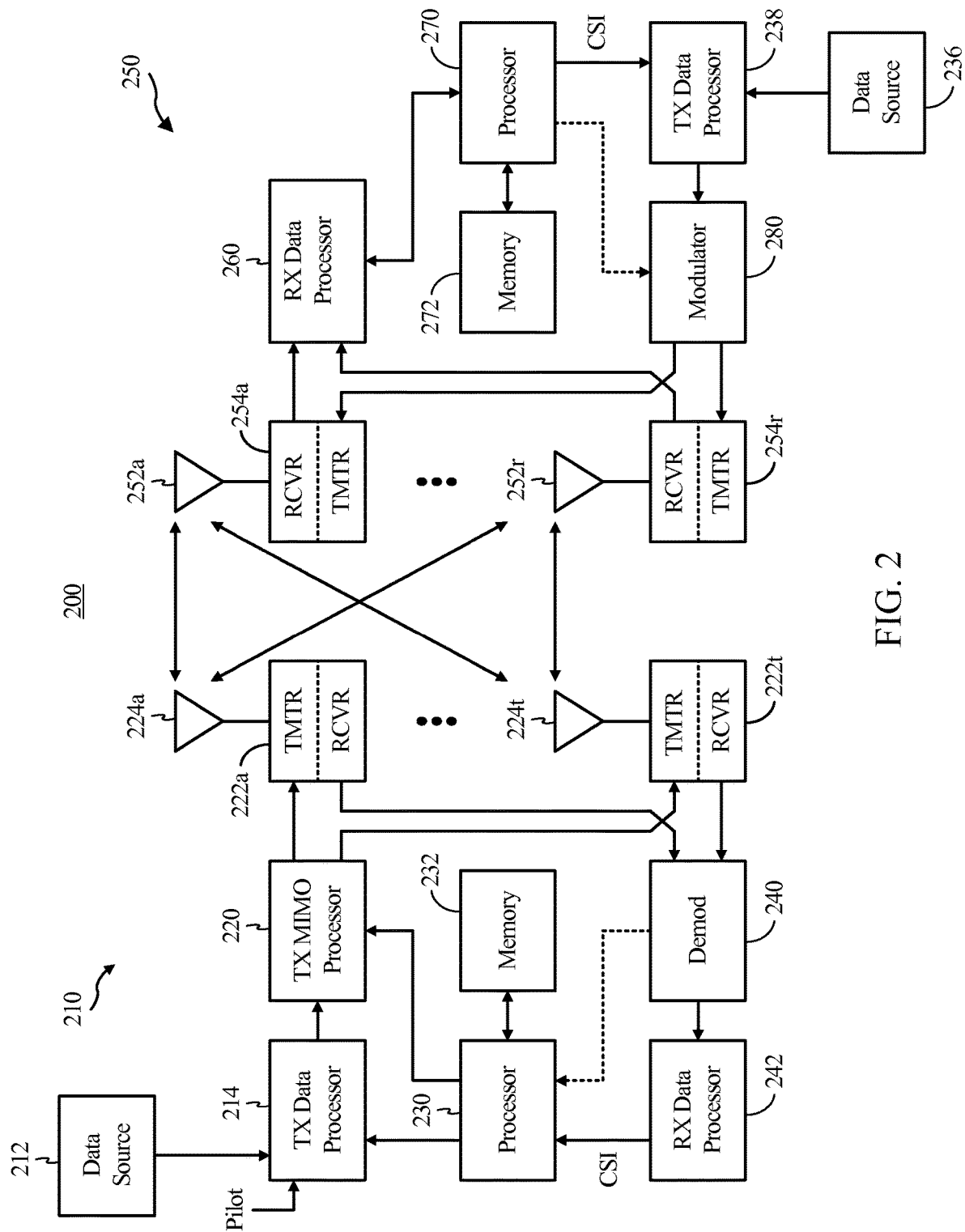
FIG. 2 illustrates a block diagram of a communication system, in accordance with certain aspects of the present disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214. Embodiments of the present disclosure are also applicable to a wireline (wired) equivalent system of FIG. 2. Both transmitter system 210 and receiver system 250 may transmit and receive (for example, as outlined below).

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210. As described in further detail below, the RX data processor 260 may utilize interference cancellation to cancel the interference on the received signal.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

Example TTI Bundling for PDSCH

In certain systems (e.g., long term evolution (LTE) Releases 8-10), transmission time interval (TTI) (or subframe) bundling can be configured on a per user equipment (UE) basis. The subframe bundling operation may be configured by the parameter ttiBundling provided by higher layers.

If TTI bundling is configured for a UE, the subframe bundling operation may only be applied to uplink (UL) shared channel (SCH)—not applied to other UL signals/traffic (e.g., uplink control information (UCI)). The bundling size may be fixed at 4 subframes. That is, physical uplink shared channel (PUSCH) may be transmitted in 4 consecutive subframes. The same hybrid automatic repeat request (HARQ) process number may be used in each of the bundled subframes. The resource allocation size may be restricted to up to 3 resource blocks (RBs). The modulation order may be set to 2 (e.g., quadrature phase shift keying (QPSK)). A bundle may be treated as a single resource, for example, a single grant and a single HARQ acknowledgement (ACK) is used for each bundle.

TTI Bundling may mainly be used for low rate traffic. If voice over internet protocol (VoIP) packets are not transmitted in a single TTI due to a low link budget for uplink, Layer 2 (L2) segmentation may be applied. For example, a VoIP packet may be segmented in four radio link control (RLC) protocol data units (PDUs) that are transmitted in four consecutive TTIs and two or three HARQ retransmissions may be targeted to achieve sufficient coverage. However, this approach may have some drawbacks. For example, each additional segment may introduce a one byte RLC, one byte medium access control (MAC), and three byte L1 cyclic redundancy check (CRC) overhead, (e.g., 15% overhead assuming a 33 byte RLC service data unit (SDU) size). This means that for four segments, there may be an additional L1/L2 overhead of 45%.

In addition, HARQ transmissions/retransmissions for every segment may use grants on physical downlink control channel (PDCCH), which may consume significant PDCCH resources. Each HARQ transmission or retransmission may be followed by HARQ feedback on physical HARQ indicator channel (PHICH). Assuming a NACK-ACK error ratio of $10^{-3}$, the large number of HARQ feedback signals may lead to high packet loss probabilities. For example, if twelve HARQ feedback signals are sent, the HARQ feedback error ratio may be on the order of $1.2*10^{-2}$. Packet loss rates of more than $10^{-2}$ may not be acceptable for VoIP traffic.

In TTI bundling, usage of only a single uplink grant and a single PHICH signal per TTI bundle may be advantageous. Also the L1 and L2 overhead may be minimized since no L2 segmentation is required.

Coverage improvements for medium data rate physical uplink shared channel (PUSCH) and UL VoIP may be desirable. The minimum gain for consideration of specifying the potential solution may be 1 dB for both medium data rate PUSCH and UL VoIP. Potential solutions are TTI bundling enhancements for medium data rate and VoIP, while considering L1/Higher layer protocols overhead and latency.

In addition to low cost, a 15 dB to 20 dB coverage enhancement may be desirable, in order to cover devices (e.g., machine type communications (MTC) devices) that are in low coverage areas (e.g., in the basement). Large TTI bundling size (e.g., in order of 100 subframes) may be one possible solution to address UL coverage enhancements. Large TTI bundling size may possibly be considered for downlink (DL) coverage enhancements as well.

On the downlink, TTI bundling has been proposed for physical broadcast channel (PBCH), physical downlink control channel (PDCCH), enhanced PDCCH (ePDCCH), PHICH, and physical downlink shared channel (PDSCH). On the uplink, TTI bundling has been proposed for random access channel (RACH), physical uplink control channel (PUCCH), and PUSCH.

Broadcast PDSCH includes PDSCH for paging, PDSCH for system information block (SIB), PDSCH for random access response, etc. In case of TTI bundling for broadcast PDSCH, some special rules may ensure proper system operation.

In a first example, the UE may assume that channel state information (CSI) reference signals (RSs) are not transmitted in the primary cell in subframes configured for transmission of paging messages in the primary cell for any UE with the cell-specific paging configuration.

In a second example, the UE may assume that CSI-RS are not transmitted in subframes where transmission of a CSI-RS would collide with SystemInformationBlockType1 messages.

In a third example, a UE may assume that positioning reference signals (PRS) are not present in RBs in which the UE decodes PDSCH according to a detected PDCCH with cyclic redundancy check (CRC) scrambled by the system information radio network temporary identifier (SI-RNTI) or paging RNTI (P-RNTI) with downlink control information (DCI) format 1A or 1C intended for the UE.

In a fourth example, broadcast PDSCH may be based on cell-specific reference signal (CRS). In multimedia-broadcast single frequency network (MBSFN) subframes where non-MBMS (multimedia broadcast multicast service) traffic is allowed, there may be no CRS and only UE-RS based PDSCH may be supported (MBSFN may also be referred to as MBMS single frequency network, multimedia broadcast single frequency network, etc.).

Accordingly, what is desired are techniques for TTI bundling for PDSCH, which may ensure proper system operation.

Techniques are provided herein for transmission time interval (TTI) bundling for physical downlink shared channel (PDSCH) in long term evolution (LTE). According to certain aspects, TTI bundling for PDSCH may be subframe dependent in order to ensure proper system operation in the cases of collisions with reference signals (RS) (e.g., channel state information (CSI) RS or positioning RS (PRS)). For example, only a subset of possible of subframes may be bundled. In order to avoid collisions, reference signals may be dropped in certain subframes. For certain aspects, the reference signals may puncture the PDSCH or rate matching may be performed around resource elements occupied by the reference signals. For certain aspects, different techniques may be used for different types of PDSCH (e.g., PDSCH for paging, broadcast PDSCH with system information block (SIB), PDSCH for random access response).

Figure 3:
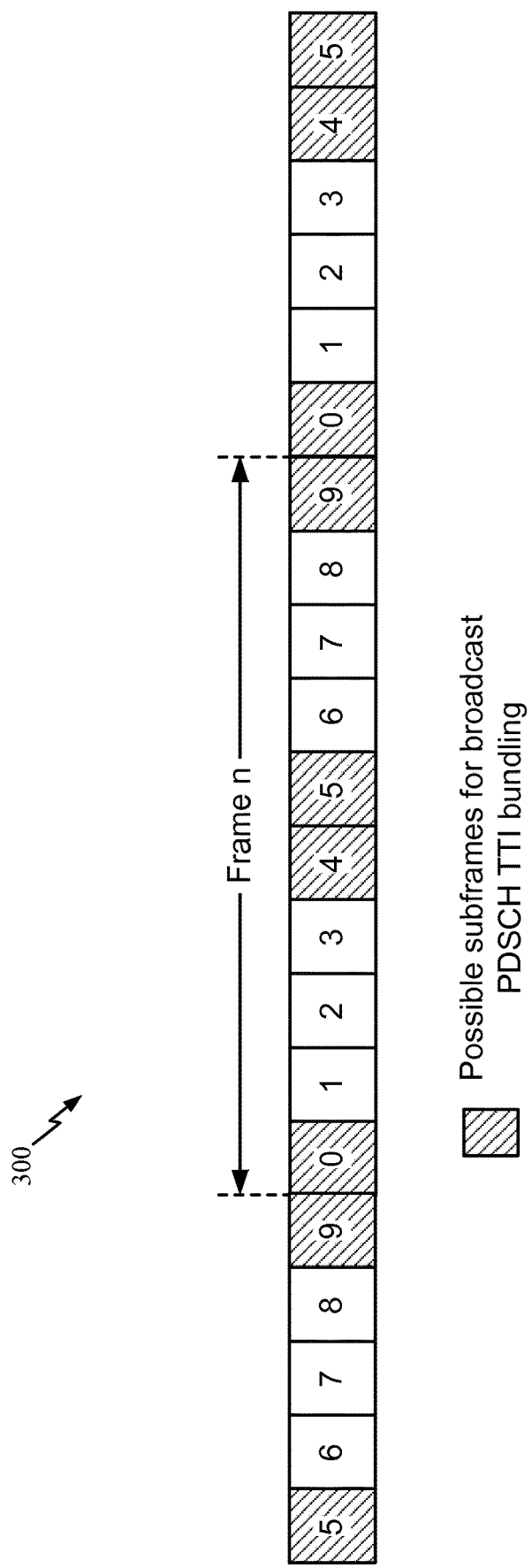
FIG. 3 illustrates example possible subframes for broadcast PDSCH TTI bundling, in accordance with certain aspects of the present disclosure.

According to certain aspects, TTI bundling for broadcast PDSCH may be performed in only a subset of subframes—versus in all possible subframes. FIG. 3 illustrates example frame configuration 300 with possible subframes for broadcast PDSCH TTI bundling for FDD, in accordance with certain embodiments of the present disclosure. In aspects, TTI bundling may be subframe-dependent, that is, TTI bundling may be performed in some subframes and not performed in other subframes. As illustrated in FIG. 3, in one example, for frequency division duplex (FDD) PDSCH transmissions, TTI bundling may be performed only in subframes 0, 4, 5, and 9. Although not illustrated in FIG. 3, in another example, for time division duplex (TDD) PDSCH transmissions, TTI may be performed in subframes 0, 1, 5, and 6.

According to certain aspects, the subset of subframes for broadcast PDSCH TTI bundling may be hardcoded in the specifications. Alternatively, the subset of subframes for broadcast PDSCH TTI bundling may be signaled (e.g., via broadcast or dedicated signaling) to the UE. Signaling the subset may be a more flexible approach.

According to certain aspects, different types of broadcast PDSCH (e.g., paging, PDSCH with SIBs, etc.) may use the same or a different subset of subframes. For example, paging TTI bundling may be in only subframes 0/4/5/9, while broadcast PDSCH with SIBs may be in any non-MBSFN subframes configured for the cell (e.g., if the cell has subframes 3 and 7 for MBSFN subframes, then TTI bundling for broadcast PDSCH with SIBs may be in subframes 0, 1, 2, 4, 5, 6, 8, and 9).

In some cases, PDSCH may collide with RSs. According to certain aspects, PDSCH may collide with CSI-RS. In aspects, if the UE is aware of TTI bundling for paging, CSI-RS may be dropped in all subframes that may potentially be involved in TTI bundling for paging. The dropping of CSI-RS may not be just limited to the set of cell-specific paging subframes originally defined.

In aspects, CSI-RS may be dropped only for the set of cell-specific paging subframes originally defined, and CSI-RS may not be dropped in other subframes involved in TTI bundling for paging. In aspects, CSI-RS may then puncture the corresponding PDSCH in the other subframes involved in TTI bundling for paging. Alternatively, rate-matching for PDSCH may be performed around REs occupied by CSI-RS.

According to certain aspects, PDSCH with SIBs may collide with CSI-RS. In aspects, CSI-RS that collides with PDSCH with SIBs may be dropped—regardless of whether the PDSCH is in the first subframe in the bundle or in subsequent subframes in the bundle. Alternatively, CSI-RS may be dropped only in the first subframe in the bundle, but not in subsequent subframes in the bundle. The first subframe of PDSCH in the bundle for SIBs and PDSCH without bundling for SIBs for other UEs may be in the same subframe. For example, there may be two sets of PDSCH with SIBs—one of UEs performing bundling and the other for regular UEs—and the two sets may be aligned in subframes. In a third alternative, CSI-RS may be dropped only in the subframes where PDSCH with SIBs for regular UEs (e.g., no PDSCH TTI bundling with SIBs) is transmitted. This approach may be especially desirable if CSI-RS is configured to be cell-specific, and/or CSI-RS for regular UEs and machine type communication (MTC) UEs are largely overlapped.

According to certain aspects, if CSI-RS collides with any PDSCH with SIBs, PDSCH may be punctured by CSI-RS. Alternatively, rate matching may be performed around REs occupied by CSI-RS.

According to certain aspects, for PDSCH associated with SI-RNTI or P-RNTI under TTI bundling, some PDSCH transmissions in the bundle may not collide with PRS (e.g., in non-PRS subframes), while other PDSCH transmissions in the bundle may collide with PRS (e.g., in PRS subframes and PRS is either narrow band or wideband).

According to certain aspects, the collision handling may depend on the subframes within a bundle. As an example, if there is collision in the first subframe of the TTI bundling, the UE may assume PRS are to be dropped. However, if there is collision in a subframe other than the first subframe of the TTI bundling, the UE may assume that PDSCH transmissions are to be dropped. Alternatively, the UE may assume PRS are to be dropped in the first subframe of the TTI bundling if there is collision and PDSCH transmissions are partially dropped in subsequent subframes of the TTI bundling if the transmissions collide with PRS, and the dropping is only for the overlapped part. In a third alternative PRS may always be dropped when there is a collision regardless of the subframes within a bundle.

According to certain aspects, a TTI bundle may fall in a MBSFN subframe. In aspects, the UE may skip the MBSFN subframe for decoding. Alternatively, the UE may transmit PDSCH based on CRS in the subframe (e.g., CRS is re-activated in MBSFN region, either partially or completely). In another alternative, the UE may transmit PDSCH based on a UE-RS pattern in the subframe. In a fourth alternative, the UE may treat the collision as an error event.

According to certain aspects, the above approaches may apply to either unicast or broadcast PDSCH. In particular, for unicast PDSCH and MBSFN subframes, it is possible but may not be desirable to have CRS based PDSCH and UE-RS based PDSCH in different subframes for the same TTI bundle.

Figure 4:
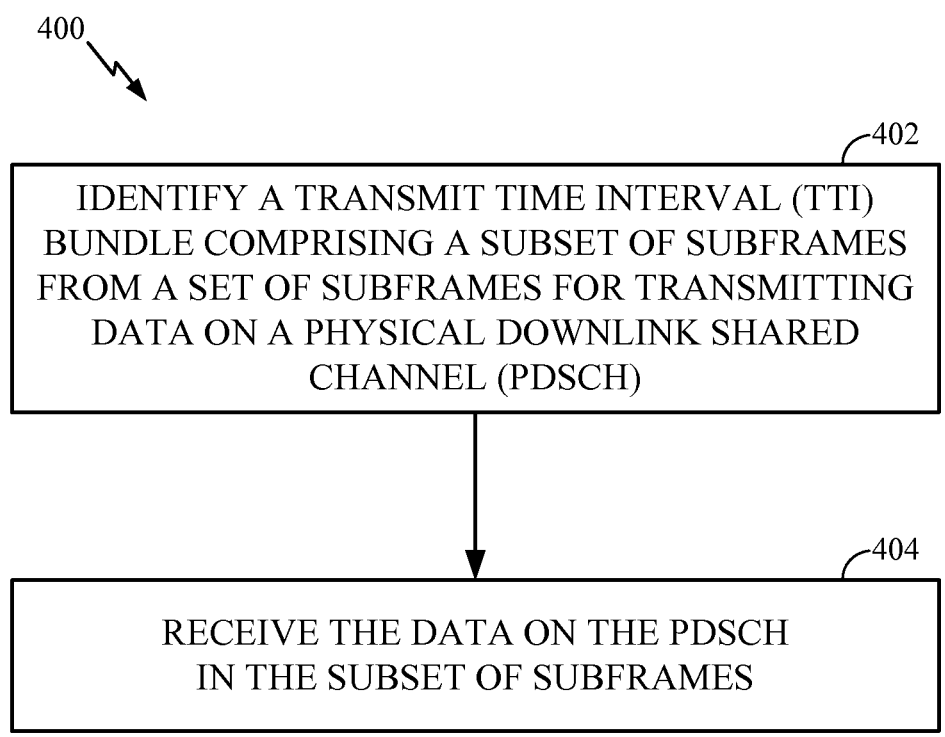
FIG. 4 illustrates example operations for wireless communications by a user equipment (UE), in accordance with certain aspects of the present disclosure.

FIG. 4 illustrates example operations 400 for wireless communications, in accordance with certain aspects of the present disclosure. The operations 400 may be performed, for example, by a UE (e.g., similar to AT 122). The operations 400 may begin, at 402, by identifying a transmit time interval (TTI) bundle comprising a subset of subframes from a set of subframes for transmitting data on a physical downlink shared channel (PDSCH). In aspects, the UE may receive signaling from the BS indicating the subset of subframes. The subset of subframes may be MBSFN subframes for PDSCH with SIBs.

At 404, the UE may receive the data on the PDSCH in the subset of subframes. For certain aspects, the PDSCH may be broadcast or unicast PDSCH and may be in frame structure of FDD or TDD.

According to certain aspects, the UE may identify another signal configured to transmit in at least one subframe in the subset of subframes (e.g., detect a collision between PDSCH and the other signal). In aspects, the signal may be a PRS, CSI-RS, or MBSFN subframe. The UE may drop the other signals, the signals may puncture PDSCH, or rate matching may be performed around REs occupied by the signals.

Figure 5:
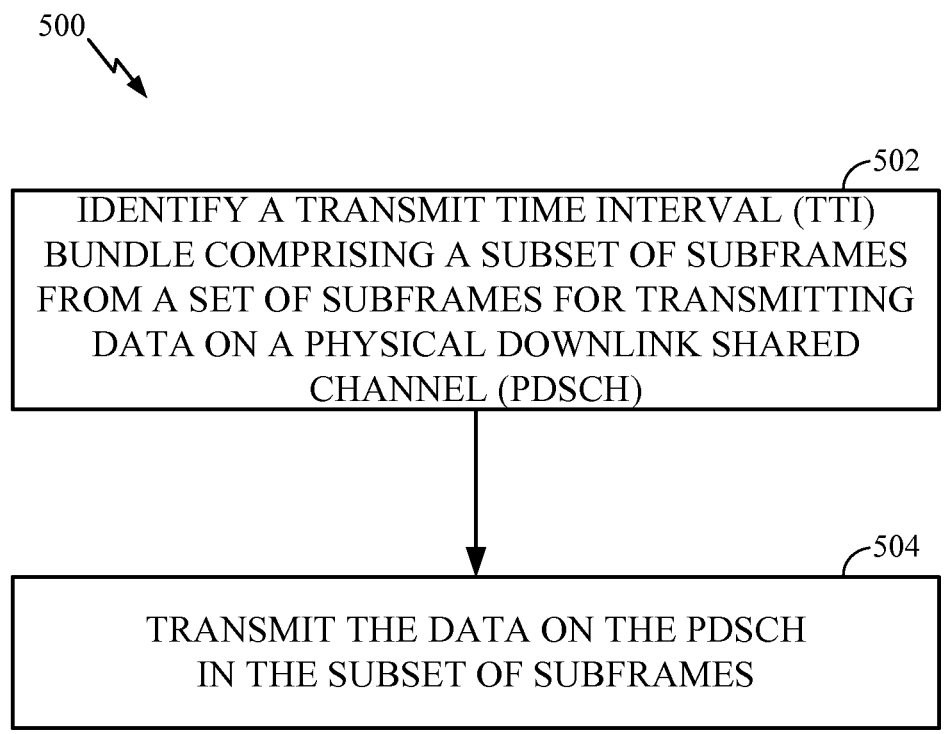
FIG. 5 illustrates example operations for wireless communications by a base station (BS), in accordance with certain aspects of the present disclosure.

FIG. 5 illustrates example operations 500 for wireless communications, in accordance with certain embodiments of the present disclosure. The operations 500 may be performed, for example, by a base station (BS) (e.g., similar to AP 102). The operations 500 may begin, at 502, by identifying a transmit time interval (TTI) bundle comprising a subset of subframes from a set of subframes for transmitting data on a physical downlink shared channel (PDSCH). In aspects, the BS may signal the UE an indication of the subset of subframes. The subset of subframes may be MBSFN subframes for PDSCH with SIBs.

At 504, the BS may transmit the data on the PDSCH in the subset of subframes. In aspects, the PDSCH may be broadcast or unicast PDSCH and may be in a frame structure of FDD or TDD.

According to certain aspects, the BS may identify another signal configured to transmit in at least one subframe in the subset of subframes (e.g., detect a collision between PDSCH and the other signal, e.g., a PRS, CSI-RS, or MBSFN subframe). The BS may drop the other signals, the signals may puncture PDSCH, or rate matching may be performed around REs occupied by the signals.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by various hardware and/or software/firmware component(s) and/or module(s) corresponding to means-plus-function blocks illustrated in the Figures. The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software/firmware module executed by a processor, or in a combination thereof. A software/firmware module may reside in any form of storage medium that is known in the art. Some examples of storage media that may be used include random access memory (RAM), read only memory (ROM), flash memory, EPROM memory, EEPROM memory, phase change memory (PCM), registers, a hard disk, a removable disk, a CD-ROM and so forth. A software/firmware module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software/firmware, or combinations thereof. If implemented in software/firmware, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software/firmware instructions may also be transmitted over a transmission medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a user equipment (UE), comprising:
   identifying a transmit time interval (TTI) bundle comprising a subset of subframes from a set of subframes for transmitting data on a physical downlink shared channel (PDSCH), wherein the subset of subframes comprises different subframes for different types of PDSCH transmissions;
   identifying a signal configured to be transmitted in one or more subframes in the subset of subframes;
   determining whether to monitor for the signal in the one or more subframes; and
   receiving the data on the PDSCH in the subset of subframes.

2. The method of claim 1, wherein the PDSCH is broadcast or unicast.

3. The method of claim 1, wherein the data is in a frame structure of frequency division duplexing (FDD) or time division duplexing (TDD).

4. The method of claim 3, wherein the subset of subframes comprises different subframes for FDD than for TDD.

5. The method of claim 1, further comprising receiving signaling indicating the subset of subframes.

6. The method of claim 1, wherein the subset of subframes comprises non-multimedia-broadcast single frequency network (MB SFN) subframes for broadcast PDSCH.

7. The method of claim 1, wherein:
   the PDSCH is for at least one of paging, system information block broadcasting, or random access response transmission;
   the signal comprises a channel state information (CSI) reference signal (CSI-RS); and
   the PDSCH is punctured with the CSI-RS in the subset of subframes or rate matched around resource elements (REs) occupied by the CSI-RS.

8. The method of claim 1, wherein:
   the signal comprises a reference signal (RS); and
   the determination comprises determining not to monitor the RS in at least one of the one or more subframes.

9. The method of claim 8, wherein:
   the RS comprises a channel state information (CSI) reference signal (CSI-RS);
   the PDSCH is for at least one of paging, system information block broadcasting, or random access response transmission; and
   the determination comprises determining not to monitor the CSI-RS in at least one of:
      cell-specific subframes involved in TTI bundling for paging,
      the subset of subframes, or
      only a first subframe of the subset of subframes.

10. The method of claim 8, wherein:
    the RS comprises a positioning reference signal (PRS); and
    the determination comprises determining not to monitor the PRS in a first subframe of the subset of subframes, further comprising:
    determining not to monitor the PDSCH transmissions in remaining subframes of the subset of subframes occupied by PRS.

11. The method of claim 8, wherein:
    the RS comprises positioning reference signals (PRS); and
    the determination comprises determining not to monitor the PRS in the subset of subframes.

12. The method of claim 1, wherein:
    one or more subframes in the subset of subframes comprises multimedia-broadcast single frequency network (MBSFN) subframes, further comprising
    skipping decoding the MBSFN subframes in the subset of subframes.

13. The method of claim 1, wherein:
    one or more subframes in the subset of subframes comprises multimedia-broadcast single frequency network (MBSFN) subframes, and
    the receiving comprises receiving PDSCH based on cell-specific reference signals (CRS) or UE specific RS in the MBSFN subframes in the subset of subframes.

14. The method of claim 1, wherein:
    one or more subframes in the subset of subframes comprises multimedia-broadcast single frequency network (MBSFN) subframes, further comprising:
    declaring an error event for the MBSFN subframes in the subset of subframes.

15. A method for wireless communications by a base station (BS), comprising:
    identifying a transmit time interval (TTI) bundle comprising a subset of subframes from a set of subframes for transmitting data on a physical downlink shared channel (PDSCH), wherein the subset of subframes comprises different subframes for different types of PDSCH transmissions;
    identifying a signal configured to be transmitted in one or more subframes in the subset of subframes;
    determining whether to drop the signal in the one or more subframes; and
    transmitting the data on the PDSCH in the subset of subframes.

16. The method of claim 15, wherein the PDSCH is broadcast or unicast.

17. The method of claim 15, wherein the data is in a frame structure of frequency division duplexing (FDD) or time division duplexing (TDD).

18. The method of claim 17, wherein the subset of subframes comprises different subframes for FDD than for TDD.

19. The method of claim 15, further comprising signaling an indication of the subset of subframes.

20. The method of claim 15, wherein the subset of subframes comprises non-multimedia-broadcast single frequency network (MB SFN) subframes for PDSCH with system information blocks (SIBs).

21. The method of claim 15, wherein:
    the PDSCH is for at least one of paging, system information block broadcasting, or random access response transmission;
    the signal comprises a channel state information (CSI) reference signal (RS); and the transmitting the data on the PDSCH comprises puncturing with the CSI-RS in the subset of subframes or performing rate matching for the PDSCH around resource elements (REs) occupied by the CSI-RS.

22. The method of claim 15, wherein:
the signal comprises a reference signal (RS); and
the determination comprises determining at least one of the one or more subframes to drop the RS.

23. The method of claim 22, wherein:
the RS comprises a channel state information (CSI) reference signal (CSI-RS);
the PDSCH is for at least one of paging, system information block broadcasting, or random access response transmission; and
the determination comprises determining to drop the CSI-RS in at least one of:
  cell-specific subframes involved in TTI bundling for paging,
  the subset of subframes, or
  only a first subframe of the subset of subframes.

24. The method of claim 22, wherein:
the RS comprises a positioning reference signal (PRS); and
the determination comprises determining to drop the PRS in a first subframe of the subset of subframes, further comprising:
dropping or partially dropping PDSCH transmissions in remaining subframes of the subset of subframes occupied by PRS.

25. The method of claim 22, wherein:
the RS comprises a positioning reference signal (PRS); and
the determination comprises determining to drop the PRS in the subset of subframes.

26. The method of claim 15, wherein:
one or more subframes in the subset of subframes comprises multimedia-broadcast single frequency network (MBSFN) subframes, and
the transmitting the data comprises transmitting PDSCH based on cell-specific reference signals (CRS) or UE specific RS in MBSFN subframes in the subset of subframes.

27. An apparatus for wireless communications by a user equipment (UE), comprising:
means for identifying a transmit time interval (TTI) bundle comprising a subset of subframes from a set of subframes for transmitting data on a physical downlink shared channel (PDSCH), wherein the subset of subframes comprises different subframes for different types of PDSCH transmissions;
means for identifying a signal configured to be transmitted in one or more subframes in the subset of subframes;
means for determining whether to monitor for the reference signal in the one or more subframes; and
means for receiving the data on the PDSCH in the subset of subframes.

28. An apparatus for wireless communications by a base station (BS), comprising:
means for identifying a transmit time interval (TTI) bundle comprising a subset of subframes from a set of subframes for transmitting data on a physical downlink shared channel (PDSCH)), wherein the subset of subframes comprises different subframes for different types of PDSCH transmissions;
means for identifying a signal configured to be transmitted in one or more subframes in the subset of subframes;
means for determining whether to drop the signal in the one or more subframes; and
means for transmitting the data on the PDSCH in the subset of subframes.

29. An apparatus for wireless communications by a user equipment (UE), comprising:
at least one processor; and
a memory coupled to the at least one processor, the memory including instructions executable by the at least one processor to cause the UE to:
identify a transmit time interval (TTI) bundle comprising a subset of subframes from a set of subframes for transmitting data on a physical downlink shared channel (PDSCH), wherein the subset of subframes comprises different subframes for different types of PDSCH transmissions;
identify a signal configured to be transmitted in one or more subframes in the subset of subframes;
determine whether to monitor for the signal in the one or more subframes; and
receive the data on the PDSCH in the subset of subframes.

30. The apparatus of claim 29, wherein the PDSCH is broadcast or unicast.

31. The apparatus of claim 29, wherein the data is in a frame structure of frequency division duplexing (FDD) or time division duplexing (TDD).

32. The apparatus of claim 29, the instructions executable by the at least one processor to further cause the UE to receive signaling indicating the subset of subframes.

33. The apparatus of claim 29, wherein the subset of subframes comprises non- multimedia-broadcast single frequency network (MBSFN) subframes for broadcast PDSCH.

34. The apparatus of claim 29, wherein:
the PDSCH is for at least one of paging, system information block broadcasting, or random access response transmission;
the signal comprises a channel state information (CSI) reference signal (CSI-RS); and
the PDSCH is punctured with the CSI-RS in the subset of subframes or rate matched around resource elements (REs) occupied by the CSI-RS.

35. The apparatus of claim 29, wherein:
the signal comprises a reference signal (RS); and
the determination comprises determining not to monitor the RS in at least one of the one or more subframes.

36. The apparatus of claim 35, wherein:
the RS comprises a channel state information (CSI) reference signal (CSI-RS);
the PDSCH is for at least one of paging, system information block broadcasting, or random access response transmission; and
the determination comprises determining not to monitor the CSI-RS in at least one of:
  cell-specific subframes involved in TTI bundling for paging,
  the subset of subframes, or
  only a first subframe of the subset of subframes.

37. The apparatus of claim 35, wherein:
the RS comprises a positioning reference signal (PRS); and
the determination comprises determining not to monitor the PRS in a first subframe of the subset of subframes, the instructions executable by the at least one processor to further cause the UE to determine not to monitor the PDSCH transmissions in remaining subframes of the subset of subframes occupied by PRS.

38. The apparatus of claim 35, wherein:
the RS comprises positioning reference signals (PRS); and
the determination comprises determining not to monitor the PRS in the subset of subframes.

39. The apparatus of claim 29, wherein:
one or more subframes in the subset of subframes comprises multimedia-broadcast single frequency network (MBSFN) subframes, the instructions executable by the at least one processor to further cause the UE to skip decoding the MBSFN subframes in the subset of subframes.

40. The apparatus of claim 29, wherein:
one or more subframes in the subset of subframes comprises multimedia-broadcast single frequency network (MBSFN) subframes, and
the receiving comprises receiving PDSCH based on cell-specific reference signals (CRS) or UE specific RS in the MBSFN subframes in the subset of subframes.

41. The apparatus of claim 29, wherein:
one or more subframes in the subset of subframes comprises multimedia-broadcast single frequency network (MBSFN) subframes, the instructions executable by the at least one processor to further cause the UE to declare an error event for the MBSFN subframes in the subset of subframes.

42. An apparatus for wireless communications by a base station (BS), comprising:
at least one processor; and
a memory coupled to the at least one processor, the memory including instructions executable by the at least one processor to cause the BS to:
identify a transmit time interval (TTI) bundle comprising a subset of subframes from a set of subframes for transmitting data on a physical downlink shared channel (PDSCH), wherein the subset of subframes comprises different subframes for different types of PDSCH transmissions;
identify a signal configured to be transmitted in one or more subframes in the subset of subframes;
determine whether to drop the signal in the one or more subframes; and
transmit the data on the PDSCH in the subset of subframes.

43. The apparatus of claim 42, wherein the PDSCH is broadcast or unicast.

44. The apparatus of claim 42, wherein the data is in a frame structure of frequency division duplexing (FDD) or time division duplexing (TDD).

45. The apparatus of claim 42, the instructions executable by the at least one processor to further cause the BS to signal an indication of the subset of subframes.

46. The apparatus of claim 42, wherein the subset of subframes comprises non- multimedia-broadcast single frequency network (MBSFN) subframes for PDSCH with system information blocks (SIBs).

47. The apparatus of claim 42, wherein:
the PDSCH is for at least one of paging, system information block broadcasting, or random access response transmission;
the signal comprises a channel state information (CSI) reference signal (RS); and
the transmitting the data on the PDSCH comprises puncturing with the CSI-RS in the subset of subframes or performing rate matching for the PDSCH around resource elements (REs) occupied by the CSI-RS.

48. The apparatus of claim 42, wherein:
the signal comprises a reference signal (RS); and
the determination comprises determining at least one of the one or more subframes to drop the RS.

49. The apparatus of claim 48, wherein:
the RS comprises a channel state information (CSI) reference signal (CSI-RS);
the PDSCH is for at least one of paging, system information block broadcasting, or random access response transmission; and
the determination comprises determining to drop the CSI-RS in at least one of:
cell-specific subframes involved in TTI bundling for paging,
the subset of subframes, or
only a first subframe of the subset of subframes.

50. The apparatus of claim 48, wherein:
the RS comprises a positioning reference signal (PRS); and
the determination comprises determining to drop the PRS in a first subframe of the subset of subframes, the instructions executable by the at least one processor to further cause the UE to drop or partially drop PDSCH transmissions in remaining subframes of the subset of subframes occupied by PRS.

51. The apparatus of claim 48, wherein:
the RS comprises a positioning reference signal (PRS); and
the determination comprises determining to drop the PRS in the subset of subframes.

52. The apparatus of claim 42, wherein:
one or more subframes in the subset of subframes comprises multimedia-broadcast single frequency network (MBSFN) subframes, and
the transmitting the data comprises transmitting PDSCH based on cell-specific reference signals (CRS) or UE specific RS in MBSFN subframes in the subset of subframes.

53. A computer readable medium having computer executable code stored thereon for wireless communications, comprising:
code for identifying a transmit time interval (TTI) bundle comprising a subset of subframes from a set of subframes for transmitting data on a physical downlink shared channel (PDSCH), wherein the subset of subframes comprises different subframes for different types of PDSCH transmissions;
code for identifying a signal configured to be transmitted in one or more subframes in the subset of subframes;
code for determining whether to monitor for the signal in the one or more subframes; and
code for receiving the data on the PDSCH in the subset of subframes.

54. A computer readable medium having computer executable code stored thereon for wireless communications, comprising:
identifying a transmit time interval (TTI) bundle comprising a subset of subframes from a set of subframes for transmitting data on a physical downlink shared channel (PDSCH), wherein the subset of subframes comprises different subframes for different types of PDSCH transmissions;
identifying a signal configured to be transmitted in one or more subframes in the subset of subframes;

determining whether to drop the signal in the one or more subframes; and transmitting the data on the PDSCH in the subset of subframes.

* * * * *